(12) United States Patent
Chau et al.

(10) Patent No.: US 7,255,725 B2
(45) Date of Patent: Aug. 14, 2007

(54) POROUS INORGANIC MEMBRANE CONTAINING CARBON; A PROCESS FOR ITS PREPARATION; AND USE THEREOF

(75) Inventors: Christophe Chau, Rueil Malmaison (FR); Denis Uzio, Marly le Roi (FR)

(73) Assignee: Institute Francais du Petrole, Rueil Malmaison Cedex (FR)

( * ) Notice: Subject to any disclaimer, the term of this patent is extended or adjusted under 35 U.S.C. 154(b) by 420 days.

(21) Appl. No.: 10/766,036

(22) Filed: Jan. 29, 2004

(65) Prior Publication Data

US 2004/0251201 A1    Dec. 16, 2004

(30) Foreign Application Priority Data

Jan. 31, 2003    (FR) .................... 03 01091

(51) Int. Cl.
| | |
|---|---|
| *C01D 59/12* | (2006.01) |
| *B01D 29/00* | (2006.01) |
| *B01D 39/00* | (2006.01) |
| *C01B 31/00* | (2006.01) |
| *B01D 63/00* | (2006.01) |

(52) U.S. Cl. .................... 95/50; 95/45; 95/47; 96/4; 210/500.25; 210/490; 210/502.1; 264/29.5; 264/42

(58) Field of Classification Search .............................. 210/500.25–500.26, 502.1, 490; 95/45, 95/47, 50; 96/4, 10–12; 264/29.5, 42, 45.1; 502/402, 527, 4, 413, 415; 428/116, 408; 427/249.2, 255.37, 249

See application file for complete search history.

(56) References Cited

U.S. PATENT DOCUMENTS

| | | | |
|---|---|---|---|
| 4,636,314 A | | 1/1987 | Beuhler et al. |
| 5,052,482 A | * | 10/1991 | Gondouin .................... 166/50 |
| 5,104,425 A | * | 4/1992 | Rao et al. ...................... 95/47 |
| 5,190,654 A | * | 3/1993 | Bauer .......................... 210/490 |
| 5,451,444 A | * | 9/1995 | DeLiso et al. .............. 428/116 |
| 5,503,873 A | | 4/1996 | Gavalas et al. |
| 5,507,860 A | * | 4/1996 | Rao et al. ...................... 96/12 |
| 5,635,148 A | * | 6/1997 | Shadman .................... 423/210 |
| 5,637,544 A | * | 6/1997 | Shadman ....................... 502/4 |
| 5,723,397 A | * | 3/1998 | Verduijn ........................ 502/4 |
| 5,785,860 A | * | 7/1998 | Smith ......................... 210/651 |
| 5,829,139 A | * | 11/1998 | Murphy et al. .......... 29/896.62 |
| 6,090,289 A | * | 7/2000 | Verduijn et al. ............ 210/644 |
| 6,140,263 A | * | 10/2000 | Anstett et al. ................. 502/4 |
| 6,214,204 B1 | * | 4/2001 | Gadkaree et al. ........... 205/758 |
| 6,527,833 B1 | * | 3/2003 | Oyama et al. ................ 96/10 |
| 6,761,929 B2 | * | 7/2004 | Damle ........................ 427/238 |
| 6,767,384 B1 | * | 7/2004 | Vu et al. ........................ 95/45 |
| 6,848,373 B2 | * | 2/2005 | Breen et al. ................ 110/341 |
| 6,913,736 B2 | * | 7/2005 | Alvin et al. ................. 422/211 |
| 7,041,616 B1 | * | 5/2006 | Nenoff et al. ................. 502/85 |
| 2003/0083534 A1 | | 5/2003 | Gauthier | |

FOREIGN PATENT DOCUMENTS

| | | |
|---|---|---|
| EP | 0332789 | 9/1989 |
| EP | 0538143 | 4/1993 |
| EP | 1281669 | 2/2003 |
| RU | 2179064 | 2/2002 |
| WO | WO 9112879 | 9/1991 |

\* cited by examiner

*Primary Examiner*—Ana Fortuna
(74) *Attorney, Agent, or Firm*—Millen, White, Zelano & Branigan, P.C.

(57) ABSTRACT

A porous inorganic membrane comprises at least one inorganic phase having separating properties. Said membrane has a carbon content representing 0.05% to 25% by weight with respect to the mass of said inorganic phase and is selective to non-condensable gases. It is obtained by means of a selectivation treatment of a porous carbon-free inorganic membrane using a hydrocarbon feed. It is used in processes for separating non-condensable molecules such as hydrogen, and in association with a catalyst in a catalytic membrane reactor.

13 Claims, No Drawings

POROUS INORGANIC MEMBRANE CONTAINING CARBON; A PROCESS FOR ITS PREPARATION; AND USE THEREOF

The present invention relates to the field of membranes that are selective for non-condensable molecules. More precisely, it concerns a porous inorganic membrane with a high separation selectivity towards non-condensable molecules present in a hydrocarbon feed, a process for preparing said membrane by a selectivation treatment, and its use in separation processes.

PRIOR ART

The production of high purity non-condensable gases such as hydrogen, oxygen or helium is often a problem for operators wishing to use them in different processes, for example as a reagent: this is the case with hydrogen for hydrogenation reactions and oxygen for oxygenation reactions. Preferably also, high purity nitrogen is used for inerting during the industrial or commercial storage of products.

Among non-condensable gases, hydrogen is of major industrial and economic importance. On an industrial scale, hydrogen is produced by a certain number of hydrocarbon transformation processes such as fluid catalytic cracking, steam reforming, catalytic reforming, gasification, partial oxidation, autothermal processes associating reforming and partial oxidation, or cokefaction or visbreaking. The hydrogen produced in said processes is mixed with light hydrocarbons (essentially methane, ethane, ethylene, propane and propylene), in particular oxides of carbon. Further, because of the increasing demand for hydrogen from the refining and petrochemicals industries, in particular for the ultimate desulphurization of fuels and more generally for hydroconversion, it is particular important to be able to recover the hydrogen present in effluents from industrial units and to carry out a membrane separation operation. Membrane separation thus necessitates the use of hydrogen-selective membranes that can be used under industrial conditions that are often severe (high temperature, high pressure, the presence of reactive chemical compounds, contaminants and impurities, for example).

Oxygen separation is also of industrial and commercial importance, as the investment and operating costs of separating air by cryogenic processes are particularly high.

Known hydrogen-selective membranes include organic membranes, generally of the organic polymer type in the form of hollow fibres, and dense metallic membranes, generally mainly constituted by palladium and at least one other metal, which form a hydrogen-permeable alloy. Said membranes, although having satisfactory hydrogen separation factors, are disadvantageous as regards their use. Organic membranes are unstable especially in the presence of traces of aromatics, olefins and hydrogen sulphide. They degrade chemically, lose their properties at temperatures of more than 90-120° C. and require a high feed pressure, generally in the range 5-9 MPa. Metallic membranes require high temperature operations, generally of the order of 400-500° C., and the hydrogen flux through such dense membranes remains low to very low. Further, such membranes are particularly sensitive to the effects of molecules such as carbon monoxide CO, carbon dioxide $CO_2$, hydrogen sulphide $H_2S$, or olefins, which inhibit, poison the membranes or dissolve in the metal (forming metal sulphides and carbides), limiting the flux of hydrogen through the membrane. Further, the hydrogen permeability of said organic and metallic membranes, which are dense materials, remains low.

The use of porous inorganic membranes, in particular zeolitic membranes, is also known in separating gases. Their textural properties (uniform porosity, very narrow pore size distribution) and the topology of such solids endows them with an interesting potential for separation, which is based on diffusional and thermodynamic selectivity (separation by size, steric exclusion and molecular sieving). The surface properties (polarity, hydrophilic or hydrophobic nature) induces separation selectivity by differential adsorption and preferential interactions between the surface of the membrane and certain molecules of a mixture. Such textural and surface polarity properties, more generally the physicochemical properties of the zeolitic membrane, can be adjusted during synthesis of the material (stoichiometry and nature of precursors, mode of material production, direct insertion of substitution atoms into the crystalline lattice of the zeolite in particular) and/or post-synthesis modification (ion exchange, including cation exchange, chemical species impregnation, surface modification by chemical liquid or vapour phase grafting, steam treatment in particular). The nature of said treatments, in particular steam treatment and cation exchange, which needs a high mechanical stirring rate, is not suitable for modification to porous inorganic membranes and thus such treatments remain poorly understood. Said treatments, necessitating a plurality of steps, sometimes at different temperatures, immersion in solutions with differing salinity, alkalinity or basicity, calcining at high temperatures, can cause fissures in the selective layer of the membrane and cause defects in the final material, resulting in a loss in the separation properties of such materials.

In particular, concerning hydrogen/hydrocarbon separation using a zeolitic membrane, it is known that at low temperatures, hydrocarbons are strongly and preferentially adsorbed on the surface or in the pores of the zeolite. Hydrogen, though, cannot be adsorbed on the zeolite and as a result it does not traverse or only slightly traverses the separating and selective layer of the zeolitic membrane. Under the effect of a chemical potential gradient (concentrations for liquids or partial pressures for gases), the hydrocarbons diffuse in the adsorbed phase through the pores of the zeolitic membrane and then traverse the separating and selective layer of the membrane, and are recovered in the permeate. Hydrogen is recovered in the presence of a residual amount of hydrocarbons in the retentate, on the side of the membrane on which the feed moves. At high temperatures, for example at 150-200° C., when separating a $H_2/nC_4$ mixture using a MFI structure type zeolitic membrane, adsorption phenomena are less marked and diffusion becomes important. Hydrocarbons adsorb less strongly on the surface or in the pores of the membrane, the hydrogen diffuses and it is partially recovered in the permeate. Separation is generally limited and hydrocarbons are mainly found in the retentate. $H_2$/hydrocarbon separation using porous inorganic membranes thus remains limited and it is currently difficult to separate or extract the hydrogen present in a hydrocarbon mixture with a high selectivity.

Thus, the present invention proposes to overcome the disadvantages encountered both with dense membranes of an organic or metallic nature and with porous inorganic membranes, by providing a selective porous inorganic membrane which is permeable to non-condensable molecules and allows the separation of said molecules present in hydrocarbon mixtures with a high separation selectivity towards said molecules.

DESCRIPTION OF THE INVENTION

The present invention provides a porous inorganic membrane comprising at least one inorganic phase having separating properties, said membrane being characterized in that it has a carbon content representing 0.05% to 25% by weight with respect to the mass of said inorganic phase and in that the carbon is distributed in the porosity in a graduated manner.

The membrane of the invention is permeable and selective to non-condensable molecules with dimensions of less than 0.8 nm (nanometres), preferably less than 0.6 nm and more preferably less than 0.5 nm. Preferably, the non-condensable molecules for which the membrane of the invention is selective and permeable are non-condensable gases selected from hydrogen, nitrogen, oxygen, helium, hydrogen sulphide $H_2S$, methane, carbon monoxide CO and carbon dioxide $CO_2$.

The porous inorganic membrane of the invention advantageously has a carbon content representing 0.1% to 10%, highly advantageously 1% to 8% by weight with respect to the mass of inorganic phase having separating properties, the carbon being distributed in the porosity of the membrane in a graduated manner.

In accordance with the invention, the inorganic phase having separating properties can allow selective separation of the non-condensable molecules cited above present in a hydrocarbon feed. Said inorganic phase has a high permeability and selectivity to said molecules.

In accordance with the invention, the carbon is present in at least a portion of the pores of the membrane of the invention and/or in the vicinity thereof. It is distributed in the porosity of the membrane in a graduated manner: it is not distributed homogeneously throughout the porous network of the membrane. The carbon gradient is such that the carbon content preferably represents 1% to 3% by weight with respect to the mass of the first third of the inorganic phase having separating properties, 6% to 8% by weight with respect to the mass of the second third of the inorganic phase having separating properties and 15% to 20% by weight with respect to the mass of the third third of the inorganic phase having separating properties.

In accordance with the invention, the porous inorganic membrane is selected from zeolitic membranes, modified zeolitic membranes, aluminosilicate membranes, silica membranes, alumina membranes and composite membranes. Composite membranes are obtained with different inorganic phases, such as zeolitic membranes supported on alumina, glass, silica, carbon or metal. The modified zeolitic membranes can in particular be zeolitic membranes containing one or more transition elements, in particular titanium, boron, germanium or gallium. Zeolitic membranes include those in which the zeolite has structure type MFI, LTA, SOD, CHA, ANA, ERI, TON, AEL, EUO, MEL, MTT and FAU. All of said membranes are well known in the art.

Thus, the inorganic phase having separating properties is preferably selected from zeolites, modified zeolites, aluminosilicates, aluminas, silicas and a mixture of two or more of said phases. Clearly, said inorganic phase having separating properties is porous.

Methods for preparing the membranes of the invention have been described, for example, in European patent EP-A1-1 230 972, in United States patents U.S. Pat. No. 6,090,289, U.S. Pat. No. 6,140,263, U.S. Pat. No. 5,723,397 and in International patents WO-A-96/01683 and WO-A-00/33948.

The porous inorganic membrane of the invention is catalytically inactive and is free of any type of catalytic element in its porous network.

In general, preparation of an inorganic membrane of the invention, particularly a zeolitic membrane, comprises: a) at least forming a gel (or solution) containing at least the precursors of said membrane, preferably at least one source of silicon and water, optionally supplemented with an organic compound; b) crystallizing the inorganic phase having separating properties, preferably a zeolite; and c) eliminating residual agents. Elements such as boron, germanium, gallium or titanium can be introduced during step a). Elimination of residual elements in step c) is generally carried out at 350° C. to 550° C. using variable temperature programming or an isothermal stage, in an air oven or an $N_2/O_2$ atmosphere oven in varying proportions. A step for washing with water, followed by drying and calcining using techniques that are known to the skilled person, can also be applied.

The membrane of the invention can have a tubular, planar, spiral wound or hollow fibre geometry, or it can be in the form of multi-channel monoliths. Other geometries may also be suitable. Preference will be given to any system that can use large membrane surface areas in a compact module, which allows the treatment of feeds at high flow rates with a compact system by limiting the bulk and investment and operating costs.

In a preferred embodiment of the membrane of the invention, the porous inorganic membrane is supported. Any type of inorganic support can be used, such as silica, alumina, glass, carbon, zirconia, titanium oxide, clay, porous metal, or a combination of said materials. The support can have a tubular, planar, spiral wound or hollow fibre geometry, or it can be in the form of multi-channel monoliths, but any geometry may be suitable, a priori. In particular, supports and spiral wound, tubular or hollow fibre type membranes that allow the modules to be operated in compact units (high ratio of membrane surface area to volume of the apparatus) can be used. To prepare a supported membrane, it is generally appropriate to bring the gel or solution containing at least the precursors of said membrane into contact with a support such as those described above.

Preferably, the porous inorganic membrane of the invention is a microporous, mesoporous or macroporous type membrane. The term "microporous membrane" means any membrane with a pore size that is strictly less than 2 nm (nanometers). The term "mesoporous membrane" means any membrane with a pore size in the range 2 nm to 50 nm, using the IUPAC definition. In accordance with the invention, the term "macroporous membrane" means membranes with a pore dimension of more than 50 nm and less than 200 nm and preferably in the range 50 to 100 nm.

The porosity of said porous inorganic membrane of the invention can be either uniform or graduated. The porosity of the membrane is termed uniform when the pore size is homogeneous throughout the pore network of the membrane, i.e., when the pore size distribution is narrow. The membrane porosity is termed "graduated" when the pore size is not homogeneous throughout the pore network of the membrane and increases gradually over the surface. Depending on the geometries of the membrane, the graduated variation can be modulated longitudinally, axially or radially, for example. The difference in pore size, also known as the porosity gradient, in the pore network is advantageous to provide optimal control of the permeability of the membrane and/or the separation selectivity. As an example, over the first third of the surface of the membrane, the pore size is in the range 10 to 20 nm, preferably in the range 10 to 15 nm; over the second third of the membrane surface, the pore size is in the range 2 to 5 nm, preferably in the range 2 to 3 nm; and over the third third of the membrane surface, the pore size is less than 1 nm, preferably less than 0.8 nm. Said membranes with a porosity gradient are already known: examples are the Membralox® type controlled porosity inorganic membrane sold by Vivendi and is a tubular membrane with a longitudinal porosity. A further non-limiting example concerns a zeolitic membrane supported on mesoporous alumina; the support can be constituted over its entire length by a 10 nm porous alumina coated with gamma allotropic alumina with a porosity of 5 nm over the second third of the membrane surface, and coated with MFI type zeolite with a 0.55 nm porosity obtained by hydrothermal synthesis over the third third of the membrane.

The porous inorganic membrane of the invention has a high permeability and selectivity for non-condensable molecules, preferably the non-condensable gases $H_2$, $O_2$, $N_2$, He, $H_2S$, $CH_4$, CO, $CO_2$. In particular, the separating performance of the membrane of the invention is substantially improved compared with known porous inorganic membranes containing no carbon. They also have highly satisfactory properties in terms of chemical and thermal stability.

In a further aspect, the invention concerns a process for preparing the membrane of the invention, comprising a selectivation treatment of a porous carbon-free inorganic membrane with the aim of depositing in the pores of said porous carbon-free inorganic membrane and in the vicinity thereof a quantity of carbon such that the membrane of the invention has a carbon content representing 0.05% to 25%, preferably 0.1% to 10% and more preferably 1% to 8% by weight with respect to the mass of the inorganic phase having separating properties, the carbon being distributed in the pores of the membrane in a graduated manner.

The process of the invention comprises a step a) for bringing a porous carbon-free inorganic membrane comprising at least one inorganic phase having separating properties into contact with a hydrocarbon feed at a temperature in the range 20° C. to 550° C., followed by a step b) consisting of bringing the membrane from step a) into contact with a hydrocarbon feed at a temperature in the range 20° C. to 550° C. The contact time in step a) is preferably in the range 1 minute to 3 days, more preferably in the range 30 minutes to 12 hours. The contact period in step b) is preferably in the range 1 minute to 2 days, more preferably in the range 1 minute to 6 hours. The temperature employed in step b) is preferably higher than that employed in step a). Then temperature employed in step a) is preferably in the range 50° C. to 120° C. and that employed in step b) is preferably in the range 120° C. to 220° C., more preferably in the range 120° C. to 180° C. The pressure employed in steps a) and b) is preferably in the range 0.1 to 10 MPa.

The membrane from step a) is advantageously maintained, before undergoing step b), at a temperature that is higher than that employed to carry out step a) for a period of 1 minute to 6 hours. As an example, it is maintained at a temperature in the range 120-220° C.

Preferably, the hydrocarbon flow rate is higher in step b) than in step a). As an example, the molar quantity of the hydrocarbon feed injected in step b) represents 30% to 200%, preferably 50% to 150% of that injected in step a). The carbon is deposited by chemical reaction of the hydrocarbon with the surface of the membrane.

The membrane from step b) can undergo one or more subsequent contact step(s) with a hydrocarbon feed.

The membrane from step b) is advantageously maintained, prior to undergoing any other subsequent step with a hydrocarbon feed, at a temperature that is higher than that employed to carry out step b), for a period of 10 minutes to 5 hours. As an example, it is maintained at a temperature in the range 150-250° C., preferably in the range 180-230° C.

In accordance with the process of the invention, the hydrocarbon feed used for the selectivation treatment of the porous carbon-free inorganic membrane comprising at least one inorganic phase having separating properties is advantageously selected from olefins, polyolefins, acetylenes, polyacetylenes, aromatics, polyaromatics, molecules containing one or more aromatic ring(s) with one or more hydrocarbon chain(s), for example of the olefin or acetylene type, hydrocarbon molecules containing heteroatoms such as N, O, S, Si, P, and hydrocarbon molecules containing functionalized groups such as $SO_3H$ sulphonic, carboxylic, phosphoric, phosphonic, chlorine or bromine groups. The molecules necessary for functionalization can be used alone, as a mixture of said molecules or in the presence of a gas, liquid or vapour phase diluent. In the case of dilution, the hydrocarbons preferably represent 1% to 65% and more preferably 5% to 50% by volume of the total quantity of hydrocarbon feed added to a diluent.

The hydrocarbon feed can be deposited in the pores of the porous carbon-free inorganic membrane and in the vicinity thereof by chemical or physical adsorption, oligomerization or chemical grafting by reaction.

In a first implementation of the process of the invention, steps a) and b) are carried out at a given fixed temperature: the selectivation treatment of said porous inorganic membrane with said hydrocarbon feed is isothermal. In a second implementation of the process of the invention, steps a) and b) are carried out by dint of a non-isothermal thermal program. Said non-isothermal thermal program can, for example, comprise at least two steps constituted by raising the temperature to between 25° C. and 550° C., followed by reducing the temperature, for example to less than 200° C., preferably less than 100° C. for step a). The non-isothermal thermal program can also comprise in succession at least three steps constituted by raising the temperature to between 50° C. and 400° C., by a constant temperature stage of variable duration, for example 1 minute to 48 hours, and by a temperature reduction, for example to less than 200° C. Other non-isothermal thermal programs can clearly be envisaged.

The porous carbon-free inorganic membrane that undergoes said selectivation treatment with said hydrocarbon feed is selected from zeolitic membranes, modified zeolitic membranes, aluminosilicate membranes, silica membranes, alumina membranes and composite membranes. Composite membranes are obtained with different inorganic phases, such as zeolitic membranes supported on alumina, glass, silica, carbon or metal. The modified zeolitic membranes can in particular be zeolitic membranes containing one or more transition elements, in particular titanium, boron, germanium or gallium. Zeolitic membranes include those in which the zeolite has structure type MFI, LTA, SOD, CHA, ANA, ERI, TON, AEL, EUO, MEL, MTT and FAU. All of said membranes are well known in the art.

Said porous carbon-free inorganic membrane is a microporous, mesoporous or macroporous type membrane. Definitions for the terms "microporous", "mesoporous" and "macroporous" as used in the present invention were given above in the description of the invention. Said porous carbon-free inorganic membrane may have a uniform or graduated porosity.

When the porous inorganic membrane of the invention is used to separate a non-condensable gas contained in a hydrocarbon feed, the selectivation treatment of the porous carbon-free membrane comprising at least one inorganic phase having separating properties is advantageously carried out directly with said hydrocarbon feed containing the gas to be separated (in situ treatment).

The selectivation treatment using a hydrocarbon feed of said porous carbon-free inorganic membrane is also particularly suitable for defects or fissures in said membrane. The deposition of hydrocarbon species, with the carbon being deposited in the porosity in a graduated manner, can be made in the defects in the inorganic phase having separating properties and thus limit the presence of defects, which have no separation properties, in the membrane.

The presence of coke and/or hydrocarbon species deposited in the pores of the membrane of the invention and in the vicinity thereof in a graduated manner allows the textural properties and the surface polarity of the material to be modified and modulated. By dint of the at least partial blocking of the pores with carbon which is distributed in the porosity in a graduated manner causing a reduction in the pore size and/or which poisons acidic surface active sites, the inorganic membrane of the invention exhibits a highly satisfactory separating performance which is considerably improved over a porous carbon-free inorganic membrane or a porous inorganic membrane containing carbon, the carbon being uniformly distributed therein.

To obtain a gradient of concentration of the carbon in the membrane, the process may be conducted under changing conditions of at least one of time, temperature and concentration of hydrocarbon that produce a gradient in the concentration of the carbon. For example, during the process for carbon introduction, the concentration of the hydrocarbon can be changed, the residence time can be changed and the temperature can be changed, at will so that there is an increasing or decreasing gradient in carbon content.

The porous inorganic membrane of the invention is suitable for use in separating non-condensable molecules contained in a hydrocarbon feed, said separation being carried out over a wide temperature range, preferably between 10° C. and 600° C., a pressure range that is preferably between 0.1 and 15 MPa, and a concentration of chemical molecules, in particular of hydrocarbons and gas from refining units, petrochemicals and gas treatment plants. The membrane of the invention is particularly suitable for use in the selective separation of non-condensable gases selected from hydrogen, oxygen, helium, nitrogen, hydrogen sulphide $H_2S$, carbon monoxide CO, carbon dioxide $CO_2$ and methane contained in a hydrocarbon feed, for example an effluent from a refinery or from petrochemistry.

The porous inorganic membrane of the invention can be used in a unitary separation operation or in combination with a further separation operation such as distillation, adsorption, solvent adsorption, or in association with other membrane separation operations.

In a further aspect, the present invention concerns the use of the membrane of the invention in association with at least one catalyst. Associating the membrane of the invention with a catalyst couples the separation of a non-condensable gas, preferably hydrogen and oxygen, contained in a hydrocarbon feed with a catalytic reaction. Any type of catalyst that is known to the skilled person can be used in association with the membrane of the invention. Said catalyst is generally in the divided form, for example in the form of beads, grains or extrudates. Associating the membrane of the invention with a catalyst can take different forms. The catalyst and membrane can be associated in the same reactor to form a membrane reactor which is preferably tubular in shape, but any geometry can be envisaged, a priori. The catalyst and membrane of the invention can also be associated by coupling said membrane with a catalytic reactor, the catalytic reactor and the membrane forming two distinct entities. Associating the membrane of the invention with a catalyst is advantageously used to carry out hydrocarbon hydroconversion reactions, which require hydrogen. As an example, the membrane/catalyst combination is used in hydrogenation reactions, in particular selective hydrogenation, hydroisomerization and hydrodesulphurization to couple distribution of hydrogen with one of said reactions. In accordance with this implementation, the invention consist of using the membrane of the invention in association with a catalyst to carry out hydroconversion of hydrocarbon feeds, and preferably hydrogenation of unsaturated compounds, the membrane of the invention is selective to hydrogen and acts as a selective distributor for hydrogen in the catalytic bed downstream of the membrane; the hydrogen, brought into direct contact with the upstream face of the membrane of the invention and which has selectively traversed said membrane, is then in the downstream space of the membrane where it reacts in the reaction zone of the reactor with the hydrocarbon feed. The operating conditions for carrying out such a hydroconversion reaction, and preferably a hydrogenation reaction, are generally as follows:

hydrocarbon feed supply pressure: 0.1 to 6 MPa, preferably 0.2 to 5 MPa and more preferably 0.7 to 4 MPa;

hydrogen pressure (upstream of membrane): 0.1 to 3 MPa, more preferably 0.2 to 2 MPa and more preferably 02 to 1.5 MPa;

temperature: 5° C. to 300° C., preferably 10° C. to 220° C., more preferably 15° C. to 150° C.;

hourly space velocity (HSV) of the feed containing the compounds to be hydrogenated: 0.05 to 50 $h^{-1}$, preferably 1 to 20 $h^{-1}$ and more preferably 2 to 10 $h^{-1}$ with respect to the catalyst employed in the hydrogenation reaction.

The association of the membrane of the invention with a catalyst is also advantageously employed to carry out oxidation reactions, in particular partial oxidation reactions. An example may be the oxidation of organic compounds such as olefins, acetylenes, alkanes, naphthenes and alkylaromatics.

When the membrane of the invention has a graduated porosity (porosity gradient) and is used in association with a catalyst in a membrane catalytic reactor, then preferably, for example, the size of the pores in the membrane is higher over the fraction of the membrane located in the vicinity of the inlet to said reactor where the hydrocarbon feed containing the compounds to be converted is introduced, than over the fraction of the membrane at a distance from the reactor inlet.

EXAMPLES

The following examples illustrate the invention without in any way limiting the scope.

Examples 1

MFI Carbon-free Zeolitic Membrane Not in Accordance with the Invention

In this example, a MFI (IUPAC nomenclature) type zeolitic membrane supported on a porous alumina tube was prepared using the following procedure: The membrane was prepared by hydrothermal crystallization of a solution containing silicon (Aerosil 380, Degussa), tetrapropylated ammonium hydroxide TPAOH (Fluka) and water (solution with stoichiometry 1 $SiO_2$, 0.4 TPAOH, 22.3 $H_2O$) and underwent a treatment at 175° C. for 72 h in the presence of an allotropic alpha alumina support (Pall) with a tubular geometry. The membrane obtained, with a tubular geometry, was calcined in air at 450° C. to degrade the organic compound TPAOH. X ray diffraction and gas permeation ($nC_4H_{10}/iC_4H_{10}$) characterization confirmed that the membrane was a MFI zeolitic membrane (pore diameter about 0.55 nm) supported on alumina.

The MFI membrane obtained was used to separate hydrogen in a mixture containing hydrogen, butadiene and argon. Butadiene mixed with argon (11.1% and 88.9% respectively, total flow rate 16.6 ml/min in 0.1 MPa) was introduced into the (downstream) internal space of the membrane (internal surface of the membrane). Hydrogen (58.4% in argon) was introduced (3.3 ml/min, 0.1 MPa) into the external (upstream) space of the membrane, in contact with the external surface (upstream face) of the membrane. Separation was carried out at a temperature of 30° C. and at a pressure of 0.1 MPa. The effluent (retentate) resulting from this experiment had the following compositions: $H_2$/butadiene/Ar: 4.4/6.5/89.1%, with a $H_2$/butadiene ratio of 0.68. Further, the fluxes that traversed the membrane (permeate) contained 8.6% of butadiene (and also 46.6% of hydrogen and 44.9% of argon).

The results show that the membrane not only allows the transfer of hydrogen, but also that of hydrocarbons. The separation factor (equal here to the ratio of the concentrations of hydrogen in the permeate, 46.6%, and in the external supply, 58.4%, divided by the ratio of the concentrations of butadiene in the permeate, 8.6%, and in the internal supply, 11.1%) was close to 1.

The prepared MFI membrane was also characterized by linear butane permeation (kinetic diameter 0.43 nm) and isobutane permeation (0.49 nm). During the gas permeation measurements, the membrane was subjected to a pressure difference, the pressure on the upstream side where the feed circulated (pure linear butane n-$C_4H_{10}$ or pure isobutane i-$C_4H_{10}$) was kept constant at 0.15 MPa absolute and the pressure on the downstream side, where the permeate was recovered after selective extraction of a portion of the molecules present in the feed, was at atmospheric pressure. This pressure difference constitutes the driving force for transfer across the membrane. The flow rate of the gas traversing the membrane was measured using a volume flow meter. The detection threshold was less than 0.002 ml/min, i.e. about $10^{-6}$ mol/$m^2$.s of n-butane or isobutane. The flow rates of the gases traversing the membrane were measured with pure n-butane and isobutane. During the gas permeation measurements, the temperature was maintained at 180° C. The membrane was also treated in a flux of an inert gas at 200° C. between the linear and branched butane permeation measurements. The n-butane permeance was $2.2 \times 10^{-7}$.mol $nC_4H_{10}$/$m^2$.s.Pa and that of isobutane was 0.13 mol $iC_4H_{10}$/$m^2$.s.Pa.

Example 2

MFI Zeolitic Membrane Containing Carbon Not in Accordance with the Invention The MFI zeolitic membrane obtained in Example 1 underwent a selectivation treatment so that it contained an amount of carbon which represented 6.5% by weight with respect to the mass of MFI zeolitic phase. The external phase (upstream) of the membrane (supply and retentate side) was maintained under an atmosphere of 1,3-butadiene diluted in argon (10% by volume, at a volume flow rate of 79 micromoles/min of butadiene) at a pressure of 0.1 MPa for 5 h. Hydrogen (84 micromoles/min, 55%) was used to flush the internal surface (downstream) of the membrane (permeate side). The temperature followed a program: (1° C./min) between 30° C. and 90° C., then cooling to ambient temperature (25° C.). After cooling to ambient temperature, the MFI zeolitic membrane had a carbon content representing 6.5% by weight with respect to the mass of the MFI zeolitic phase.

Using the same conditions as those described in Example 1, butadiene mixed with argon (11.0% and 89.0% respectively, total flow rate 17.0 ml/min in 0.10 MPa) was introduced into the internal space (downstream) of the prepared membrane (internal surface of the membrane). Hydrogen (58.6% in argon) was introduced into the external space (upstream) of said membrane (3.3 ml/min, 0.10 MPa), in contact with the external surface (upstream face) of the membrane. The effluent (retentate) resulting from this experiment had the following compositions: $H_2$/butadiene/Ar: 4.5/10.4/85.2%, with an $H_2$/butadiene ratio of 0.43. Further, the fluxes that had traversed the membrane (permeate) contained 0.2% of butadiene (and also 50.2% of hydrogen and 49.6% of argon). The separation factor (equal here to the ratio of the concentrations of hydrogen in the permeate, 50.2%, and in the external supply, 58.6%, divided by the ratio of the concentrations of butadiene in the permeate, 0.2%, and in the internal supply, 11.0%) reached a value of 47.

The membrane of the invention thus had very good separation properties, which were substantially improved over a membrane that had not been treated with a hydrocarbon feed (see Example 1). The membrane of the invention was highly selective and permeable to hydrogen. This improvement in performance appears to be linked to a modification in the textural properties (porosity) and in the surface polarity by depositing hydrocarbon species in the porosity and/or in the vicinity thereof.

Example 3

Use of a MFI Membrane in Association with a Catalyst in a Selective Butadiene Hydrogenation Reaction Not in Accordance with the Invention The porous inorganic MFI membrane obtained in Example 2 was associated with grains of a divided type LD271 catalyst (2.8 g, Axens) based on palladium supported on alumina, which were introduced into the internal space (downstream) of said zeolitic membrane in the tubular form. The supply (19.4 ml/min, 0.105 MPa, butadiene 10.4%, hydrogen 3.4%, argon 86.2) was introduced into the internal space (downstream) of the membrane, in contact with the catalyst maintained at 30° C. The ratio of hydrogen to butadiene was 0.32. The weight hourly space velocity was 0.1 $h^{-1}$ (grams of butadiene per hour per gram of catalyst).

Hydrogen was introduced into the external space (upstream) of the membrane in contact with the upstream face of the membrane (28.9 ml/min, 0.105 MPa, 100% $H_2$). This hydrogen, which represented 68% of the hydrogen necessary for the selective hydrogenation reaction, diffused selectively through the membrane and then reacted in the catalytic bed in the downstream space of the membrane.

Under these conditions, the conversion of butadiene, measured by gas chromatography, reached 99.1% and the selectivity for the selective hydrogenation product, butenes, was 98.6%. The membrane of the invention could distribute the hydrogen necessary for the reaction to the catalyst. Diffusion through the membrane occurred in a controlled manner and thus could produce high butadiene conversions, with very high reaction selectivities (the butenes were produced in the vast majority).

Example 4

Zeolitic MFI Membrane Containing a Graduated Deposit of Carbon In Accordance with the Invention In this example, two zeolitic MFI membranes analogous to that obtained in Example 1 underwent a heat treatment in the presence of unsaturated hydrocarbon molecules to selectivate the inorganic phase with carbon (zeolitic MFI phase). The membranes, with a tubular geometry, were introduced into an oven with a temperature programmer. The external and internal faces of each membrane were brought into contact with 1,3-butadiene diluted in argon (10% by volume, 85 micromoles/min of butadiene) at a pressure of 0.1 MPa for 2 h at 60° C. The temperature was then increased (2° C./min) to 120° C. and maintained for 30 min. At this stage, the butadiene content was increased (25% by volume, 175 micromoles/min), at the same pressure, for 20 min. Finally, the temperature was increased (2° C./min) to 180° C. in the presence of pure butadiene for a period of 10 min. The temperature was maintained for 2 h at 180° C.

After cooling to ambient temperature, one of the two membranes underwent carbon analysis. This zeolitic MFI membrane had an overall carbon content representing 7.5% by weight with respect to the mass of the zeolitic MFI phase. An analysis was carried out on three segments of the membrane, of equal length and each representing a third of the total length of the tubular membrane, depending on the axis. This analysis revealed gradual carbon deposition: the carbon content represented 1% by weight with respect to the mass of the first third of the inorganic phase having separating properties, 6% by weight of the mass of the second third of the inorganic phase and 16% by weight of the mass of the third third of the inorganic phase having separating properties.

Using the same conditions as those described in Example 1, butadiene mixed with argon (11.0% and 89.0% respectively, total flow rate 17.0 ml/min in 0.10 MPa) was introduced into the internal space (downstream) of the prepared membrane. Hydrogen (58.6% in argon) was introduced into the external space (upstream) of said membrane (3.3 ml/min, 0.10 MPa). The effluent (retentate) resulting from this experiment had the following compositions: $H_2$/butadiene/Ar: 4.4/10.2/85.4%, with an $H_2$/butadiene ratio of 0.43. Further, the fluxes that had traversed the membrane (permeate) contained no detectable butadiene (in a mixture of hydrogen and argon). The separation factor (equal here to the ratio of the concentrations of hydrogen in the permeate and in the external supply divided by the ratio of the concentrations of butadiene in the permeate and in the internal supply) was thus infinite in the absence of measurable butadiene; ideal selectivity and preferential passage of hydrogen, with no hydrocarbon diffusion.

The membrane of the invention thus demonstrates particularly good separation properties with all evidence linked to the selective deposition of carbon in the porosity of the zeolitic phase and/or in the vicinity of said porosity. The membrane of the invention thus allows the preferential passage of hydrogen and it limits the passage of hydrocarbon (selective barrier to the passage of hydrogen).

Example 5

Use of a MFI Membrane Containing Carbon Deposited in a Graduated Manner, and Association with a Catalyst in a Selective Butadiene Hydrogenation Reaction In Accordance with the Invention The porous inorganic MFI membrane obtained in Example 4 was associated with grains of a divided type LD271 catalyst (2.8 g, Axens) based on palladium supported on alumina, which were introduced into the internal space (downstream) of said zeolitic membrane in the tubular form. The supply (19.2 ml/min, 0.1 MPa, butadiene 10.1%, hydrogen 3.5%, argon 86.4%) was introduced into the internal space (downstream) of the membrane, in contact with the catalyst maintained at 30° C. The ratio of hydrogen to butadiene was 0.34. The weight hourly space velocity was 0.1 $h^{-1}$ (grams of butadiene per hour per gram of catalyst). Hydrogen was introduced into the external space (upstream) of the membrane in contact with the upstream face of the membrane (29.0 ml/min, 0.1 MPa, 100% $H_2$).

Under these conditions, the butadiene conversion was 99.8% and the selectivity for the selective hydrogenation product, butenes, was 99.3%. The membrane of the invention could distribute the hydrogen necessary for the reaction to the catalyst. Diffusion through the membrane occurred in a controlled manner and thus could produce high butadiene conversions, with selectivities for the hydrogenation products that were even higher than when the carbon was distributed in a uniform manner in the pores of the membrane.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 03/01.091, filed Jan. 31, 2003 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A porous inorganic membrane having an external face and internal face, comprising at least one inorganic phase having separating properties, wherein the membrane has a carbon content representing 0.05% to 25% by weight with respect to the mass of said inorganic phase and in that the carbon is distributed in the pores of the membrane in an increasing graduated manner, so that the carbon content represents 1% to 3% by weight with respect to the mass of the first third of the inorganic phase having separating properties, 6% to 8% by weight with respect to the mass of the second third of the inorganic phase having separating properties and 15% to 20% by weight with respect to the mass of the third of the inorganic phase having separating properties, and provided that the membrane is free of any type of catalytic element in its porous network.

2. A porous inorganic membrane according to claim 1, characterized in that it has a carbon content representing 0.1% to 10% by weight with respect to the mass of said inorganic phase.

3. A porous inorganic membrane according to claim 2, characterized in that it has a carbon content representing 1% to 8% by weight with respect to the mass of said inorganic phase.

4. A porous inorganic membrane according to claim 1 selected from the group consisting of zeolitic membranes, modified zeolitic membranes, aluminosilicate membranes, silica membranes, alumina membranes and composite membranes having differing inorganic phases.

5. A porous inorganic membrane according to claim 1, characterized in that it is supported.

6. A porous inorganic membrane according to claim 1, having a pore size that is less than 2 nm.

7. A porous inorganic membrane according to claim 1, having a pore size in the range of 2 to 50 nm.

8. In a process separating non-condensable molecules with dimensions of less than 0.8 nm contained in a hydrocarbon feed, comprising contacting an external surface of a separating membrane, the improvement wherein the membrane is according to claim 1.

9. A process according to claim 8, in which said non-condensable molecules are selected from the group consisting of hydrogen, oxygen, helium, nitrogen, hydrogen sulphide $H_2S$, carbon monoxide CO, carbon dioxide $CO_2$ and methane.

10. A process for preparing a porous inorganic membrane according to claim 1, comprising a step a) bringing a porous carbon-free inorganic membrane comprising at least one inorganic phase having separating properties into contact with a hydrocarbon feed at a temperature in the range 20° C. to 550° C., followed by a step b) bringing the membrane from step a) into contact with a hydrocarbon feed at a temperature in the range of from more than 20° C. to 550° C., the contact time in step a) being in the range of 1 minute to 3 days, the contact time in step b) being in the range of 1 minute to 2 days, the temperature employed in step b) being higher than that employed in step a), the pressure employed in steps a) and b) being in the range of 0.1 to 10 MPa, the membrane from step a) being maintained, before undergoing step b), at a temperature that is higher than that employed to carry out step a) for a period of 1 minute to 6 hours, the hydrocarbon flow rate being higher in step b) than in step a).

11. A preparation process according to claim 10, in which said hydrocarbon feed is selected from the group consisting of olefins, polyolefins, acetylenes, polyacetylenes, aromatics, polyaromatics, molecules containing one or more aromatic nuclei with one or more hydrocarbon chains, hydrocarbon molecules containing heteroatoms and hydrocarbon molecules containing functionalized groups.

12. A preparation process according to claim 10, in which each of steps a) and b) is carried out at a constant temperature.

13. A preparation process according to claim 10, in which steps a) and b) are carried out using a non isothermal thermal program.

* * * * *